(12) United States Patent
Weber et al.

(10) Patent No.: US 11,447,180 B2
(45) Date of Patent: Sep. 20, 2022

(54) SENSOR DEVICE FOR A STEERING SYSTEM OF A VEHICLE

(71) Applicant: Robert Bosch GmbH, Stuttgart (DE)

(72) Inventors: Marten Weber, Huettlingen (DE); Philipp Seibold, Fellbach (DE); Jens Oberender, Boebingen An Der Rems (DE); Waldemar Mattus, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 16/954,345

(22) PCT Filed: Nov. 28, 2018

(86) PCT No.: PCT/EP2018/082808
§ 371 (c)(1),
(2) Date: Jun. 16, 2020

(87) PCT Pub. No.: WO2019/120910
PCT Pub. Date: Jun. 27, 2019

(65) Prior Publication Data
US 2021/0078631 A1 Mar. 18, 2021

(30) Foreign Application Priority Data

Dec. 18, 2017 (DE) ...................... 10 2017 222 999.3

(51) Int. Cl.
*H01R 12/00* (2006.01)
*B62D 15/02* (2006.01)
(Continued)

(52) U.S. Cl.
CPC ............. *B62D 15/021* (2013.01); *B62D 1/16* (2013.01); *G01L 5/221* (2013.01); *H01R 13/112* (2013.01);
(Continued)

(58) Field of Classification Search
CPC .......... B62D 15/021; B62D 1/16; B62D 5/04; G01L 5/221; H01R 13/112; H01R 13/405;
(Continued)

(56) References Cited

U.S. PATENT DOCUMENTS

| | | | |
|---|---|---|---|
| 6,707,182 B2 * | 3/2004 | Yamanaka | G01L 3/105 310/67 R |
| 7,588,444 B2 * | 9/2009 | Kataoka | H02K 11/33 439/76.2 |

(Continued)

FOREIGN PATENT DOCUMENTS

| | | |
|---|---|---|
| CN | 105073503 A | 11/2015 |
| CN | 105383550 A | 3/2016 |

(Continued)

OTHER PUBLICATIONS

International Search Report corresponding to PCT Application No. PCT/EP2018/082808, dated Mar. 25, 2019 (German and English language document) (6 pages).

*Primary Examiner* — Thanh Tam T Le
(74) *Attorney, Agent, or Firm* — Maginot, Moore & Beck LLP

(57) ABSTRACT

A sensor device for a steering system of a vehicle includes a sensor housing accommodated within a housing pot and including a first central recess defining an axis and receiving a shaft of the steering system so as to mount the sensor housing on the shaft. A sensor element is coupled to the shaft and a sensor cover is mounted on the housing pot. The sensor cover includes a second central recess receiving the shaft so as to mount the sensor cover on the shaft. An inner contact unit firmly connected to the sensor cover and electrically contacting the sensor element, the inner contact unit arranged on an inside of the sensor cover and including a connector part axially oriented along the axis. An outer (Continued)

contact unit is firmly connected to the sensor cover on an outside of the sensor cover and electrically connected to the inner contact unit.

12 Claims, 10 Drawing Sheets

(51) Int. Cl.
*B62D 1/16* (2006.01)
*G01L 5/22* (2006.01)
*H01R 13/11* (2006.01)
*H01R 13/405* (2006.01)
*H01R 13/50* (2006.01)
*H01R 31/06* (2006.01)
*B62D 5/04* (2006.01)

(52) U.S. Cl.
CPC ........... *H01R 13/405* (2013.01); *H01R 13/50* (2013.01); *H01R 31/06* (2013.01); *B62D 5/04* (2013.01); *H01R 2201/20* (2013.01); *H01R 2201/26* (2013.01)

(58) Field of Classification Search
CPC .... H01R 13/50; H01R 31/06; H01R 2201/20; H01R 2201/26; H01R 9/226
See application file for complete search history.

(56) References Cited

U.S. PATENT DOCUMENTS

| | | | | |
|---|---|---|---|---|
| 8,198,767 | B2* | 6/2012 | Migita | H02K 3/522 310/71 |
| 8,534,141 | B2* | 9/2013 | Maehara | G01L 3/104 73/862.333 |
| 9,780,619 | B2* | 10/2017 | Fujimoto | H02K 5/22 |
| 9,831,748 | B2* | 11/2017 | Hayashi | H02K 5/10 |
| 10,000,227 | B2* | 6/2018 | Kurokawa | B62D 5/0409 |
| 10,005,490 | B2* | 6/2018 | Unno | B62D 6/10 |
| 10,050,493 | B2* | 8/2018 | Kabune | B62D 5/0406 |
| 10,062,983 | B2* | 8/2018 | Morimoto | H01R 12/585 |
| 10,063,121 | B2* | 8/2018 | Nakamura | H02K 5/225 |
| 10,067,015 | B2* | 9/2018 | Lee | G01L 3/10 |
| 10,067,016 | B2* | 9/2018 | Hotta | G01L 3/101 |
| 10,088,377 | B2* | 10/2018 | Park | G01L 5/221 |
| 10,144,447 | B2* | 12/2018 | Asao | B62D 5/0463 |
| 10,211,709 | B2* | 2/2019 | Asao | H02P 25/22 |
| 10,411,552 | B2* | 9/2019 | Yamasaki | B62D 5/0403 |
| 10,468,845 | B2* | 11/2019 | Asakura | H01R 35/025 |
| 2012/0313467 | A1 | 12/2012 | Omae et al. | |
| 2016/0065030 | A1 | 3/2016 | Fujimoto | |
| 2017/0052077 | A1 | 2/2017 | Lee | |

FOREIGN PATENT DOCUMENTS

| | | |
|---|---|---|
| CN | 105960748 A | 9/2016 |
| CN | 107076573 A | 8/2017 |
| DE | 103 26 296 A1 | 12/2003 |
| DE | 396 30 893 T2 | 8/2004 |
| DE | 10 2005 038 514 A1 | 2/2007 |
| DE | 10 2005 055 949 A1 | 5/2007 |
| DE | 10 2007 032 907 A1 | 5/2008 |
| DE | 10 2006 057 022 A1 | 6/2008 |
| DE | 10 2010 024 738 A1 | 12/2011 |
| DE | 10 2012 200 390 A1 | 7/2012 |
| DE | 10 2012 103 053 A1 | 3/2013 |
| DE | 10 2012 202 676 A1 | 8/2013 |
| DE | 10 2012 103 052 A1 | 10/2013 |
| EP | 0 452 556 A2 | 10/1991 |
| EP | 1 043 570 A2 | 10/2000 |
| EP | 2 960 113 A1 | 12/2015 |
| JP | 2001-106097 A | 4/2001 |
| KR | 10-2010-0029696 A | 3/2010 |
| WO | 2008/068334 A1 | 6/2008 |

* cited by examiner

SENSOR DEVICE FOR A STEERING SYSTEM OF A VEHICLE

This application is a 35 U.S.C. § 371 National Stage Application of PCT/EP2018/082808, filed on Nov. 28, 2018, which claims the benefit of priority to Serial No. DE 10 2017 222 999.3, filed on Dec. 18, 2017 in Germany, the disclosures of which are incorporated herein by reference in their entirety.

The disclosure relates to a sensor device for a steering system of a vehicle.

BACKGROUND

DE 10 2007 032 907 A1 describes a torque sensor device for a steering system of a vehicle. The torque sensor device can be used to determine the steering torque applied to a steering shaft by the driver via the steering wheel. The torque sensor device has a cylindrical sensor housing, which is pushed onto a toothed section of the steering shaft. In the sensor housing there is a sensor element that works with a pulse generator on the shaft side.

SUMMARY

The sensor device according to the disclosure is used in steering systems of vehicles and serves in particular to determine the steering torque, which acts in a steering shaft of the steering system and which is introduced into the steering system by the driver via the steering wheel. The sensor device according to the disclosure can also be used for determining the current steering angle. In any case, the sensor device is located on a shaft of the steering system, in particular the steering shaft, through which the driver introduces the steering angle and the steering torque by operating the steering wheel.

The sensor device comprises a sensor housing, a sensor element and a sensor cover. The sensor housing is inserted, for example, in a housing pot of a steering housing, the sensor element is preferably connected to the shaft and can be located inside the housing pot. When mounted, the sensor cover covers the sensor housing and the sensor element. In this case, it may be expedient that the sensor cover is mounted on the sensor housing and the sensor element-accommodating housing pot of the steering housing.

An inner contact unit for electrical contacting of the sensor element is arranged on the inside of the sensor cover. On the outside of the housing cover there is an outer contact unit, wherein the inner contact unit and the outer contact unit are electrically connected to each other. An electrical connection to a control unit of the steering system, for example, is possible via the outer contact unit. The electrical connection between the outer contact unit of the sensor cover and the other device, such as a control unit, usually takes place via an electrical transmission component such as a cable.

Both the inner contact unit and the outer contact unit are firmly, in particular irreversibly, connected to the housing cover. In this case, the inner contact unit and the outer contact unit are integrated into the sensor cover.

The sensor cover of the sensor device according to the disclosure is thus the support of both the inner contact unit and the outer contact unit, each of which forms an electrical interface. The sensor cover is the support of both interfaces both for connection to a control unit, in particular via a cable, as well as for connection to the sensor element. Therefore the need to connect the sensor element via a recess in a housing component, in particular in the steering housing, is eliminated. Since the steering housing is made of metal, for example aluminum, there is a risk of corrosion in the area of a recess in the wall of the housing part receiving the connection line for the sensor element. In the case of the sensor device according to the disclosure, on the other hand, there is no risk of corrosion, since the inner contact unit and the outer contact unit are integrated into the sensor cover, wherein recesses in the sensor cover for passing through connection lines can be excluded.

The sensor cover can be formed as a plastic component, which is produced by an injection molding process, for example. The outer and/or inner contact units may have a contact housing, which is advantageously formed in one piece with the plastic sensor cover. Furthermore, it is possible, in the case of a plastic implementation of the sensor cover, that connector elements of the inner contact unit and/or the outer contact unit are overmolded by the plastic material of the sensor cover. This enables mechanically stable mounting as well as electrical insulation of the connector elements as well as improved corrosion resistance.

According to a further advantageous embodiment, the inner contact unit is in the form of an axially aligned connector part relative to the longitudinal axis of the shaft on which the sensor device is arranged. The plug-in connection is accordingly made by axial insertion of connector elements of the inner contact unit on the inside of the sensor cover into a counter-contact on the sensor element. This design makes it possible to establish the electrical plug-in connection between the inner contact unit and the sensor element at the same time as the axial mounting of the sensor cover on the housing. This means that a working step can be omitted during the installation of the sensor device.

The counter-contact on the sensor element to which the inner contact unit is connected may be arranged in the sensor housing if appropriate. There may be an electrical connection between the sensor element and the sensor housing, for example in the form of an electrical connecting line, which leads into the counter-contact, which is brought into electrical plug-in connection with the inner contact unit on the inside of the sensor cover.

The inner contact unit may have multiple connector pins, which preferably extend in the axial direction, in particular relative to the longitudinal axis of the shaft. With the mounting of the sensor cover, the connector pins of the inner contact unit enter into electrical connection with the counter-contact on the sensor element. For this purpose, the counter-contact has plug-in receptacles into which the connector pins are inserted.

A reverse version is also considered, in which the inner contact unit is provided with plug-in openings, into which the connector pins of the counter-contact protrude.

According to a further advantageous embodiment, the outer contact unit is in the form of a female connector part with internal plug-in openings. The plug-in connection direction in which the connection with a counter-contact is made can be oriented either radially or axially. In the case of axial orientation, an axially outward orientation can be considered, i.e. away from the sensor housing, as well as an axially inward orientation, i.e. towards the sensor housing. The outer contact unit can be located either directly on the outer side surface of the sensor cover or in the area of the outer circumference of the sensor cover.

As an alternative to a female connector part, the outer contact unit may also be in the form of a male connector part with multiple connector pins.

According to yet another advantageous embodiment, an electronic component is integrated into the sensor cover in addition to the inner contact unit and the outer contact unit. This is, for example, a chip or a printed circuit board, which carries out the recorded sensor signal evaluation functions, for example. There is an electrical connection between the inner contact unit or the outer contact unit and the electronic component in the sensor cover. The electronic component may, if necessary, be partially or completely encased in the plastic material of the sensor cover.

According to yet another advantageous embodiment, a plug-in receptacle with two connector legs is arranged in the plug-in connection between the inner contact unit and the sensor element. The contact surfaces of the connector legs, which are in contact with the connector element of the inner contact unit in the mounted state, can run parallel to each other or at least approximately parallel, however they are arranged laterally offset relative to each other. The lateral offset enlarges the play when inserting the connector element of the inner contact unit into the space between the two connector legs. Accordingly, there is a relatively large tolerance range when inserting the connector element into the plug-in receptacle with the two connector legs. This allows a reliable electrical connection even in case of play when mounting the sensor cover on the housing.

According to yet another advantageous embodiment, there is a cable connection with flexible cables between the inner contact unit and the counter-contact on the sensor housing and/or the sensor element. The cable connection allows compensation even in the case of an offset in the circumferential direction between the sensor cover and/or the inner contact unit and the counter-contact on the sensor element.

According to a further expedient embodiment, an axially protruding hold-down element is arranged, in particular formed, on the inside of the sensor cover, which presses the sensor housing into a housing pot of the steering housing. During assembly, the hold-down element on the inside of the sensor cover presses the sensor housing into the housing pot of the steering housing, whereupon the sensor element and the sensor housing are detached from each other and the sensor housing is firmly connected to the housing pot of the steering housing.

According to a further expedient embodiment, both the sensor housing and the sensor cover each have a central recess, with which the sensor housing and the sensor cover are mounted on a shaft of the steering system, in particular the steering shaft of the steering system.

In addition to the sensor housing, the sensor cover and the sensor element that form a signal receiver, the sensor device also comprises a signal transmitter, for example a permanent magnet. The signal transmitter is arranged on a first shaft section and the signal receiver on a second shaft section, wherein a rotation of the shaft sections relative to each other leads to a change of the sensed magnetic field, from which the steering torque can be inferred. The first and second shaft sections can be connected by means of a torsion bar.

The disclosure further relates to a steering system of a vehicle with a sensor device described above. In particular, the sensor device sits on a steering spindle and/or steering shaft of the steering system. The steering system may be equipped with an electric servomotor for applying a supporting servo torque.

BRIEF DESCRIPTION OF THE DRAWINGS

Further advantages and expedient designs can be found in the description of the figures and the drawings. In the figures.

DETAILED DESCRIPTION

Figure 1:
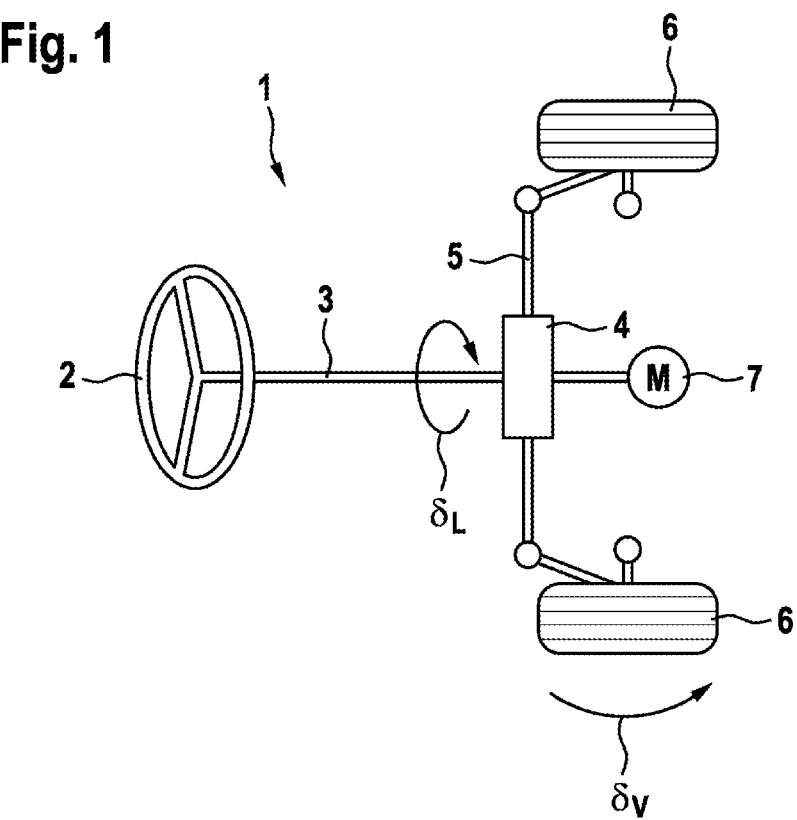
FIG. 1 shows a schematic representation of a steering system in a vehicle.

In the figures, the same components are provided with the same reference characters.

FIG. 1 shows a steering system 1 in a vehicle with a steering wheel 2, a steering shaft 3 and a steering housing 4 with a gearbox accommodated therein and a steering linkage 5, by means of which the steering movement of the driver is transferred to the steerable wheels of the vehicle. The driver specifies the steering angle $\delta_L$ via the steering wheel 2, which sits on the steering shaft 3, wherein the steering angle $\delta_L$ is transmitted in the steering gear, which is arranged in the steering housing 4, as an actuating movement of a rack of the steering linkage 5. Thereupon, the steering angle $\delta_V$ is set on the steerable wheels 6.

An electric servomotor 7 can be used to feed a servo torque into the steering gear in the steering housing 4 to support the manual torque or steering torque applied by the driver.

Figure 2:
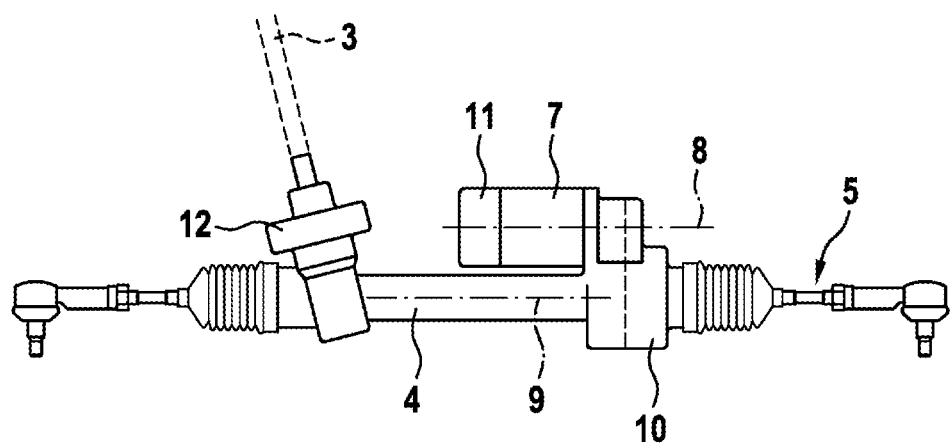
FIG. 2 shows a steering shaft and a steering linkage in a steering housing of the steering system, with a sensor device in the form of a torque sensor device by way of example for determining the steering torque on the steering shaft.

In FIG. 2, by way of example the electric servomotor 7 is arranged axially parallel to the steering linkage 5, so that the motor shaft longitudinal axis of the servomotor 7 runs parallel to the longitudinal axis 9 of the steering housing and the rack, which is part of the steering linkage 5 and which is adjusted translationally along the longitudinal axis 9 by the steering shaft 3. The motor shaft of the electric servomotor 7 is coupled to a gearbox unit 10, which is accommodated in a gearbox housing and which transmits the supporting movement of the electric servomotor 7 to the rack of the steering linkage 5. The gearbox housing of the gearbox unit 10 is advantageously connected to the steering housing. The servomotor 7 is equipped with a control unit 11, by means of which the motor control of the servomotor 7 is carried out.

On the steering shaft 3, a sensor device is arranged in the present case by way of example in the form of a torque sensor device 12, by means of which the steering torque in the steering shaft 3 is determined. The torque sensor device 12 can communicate with the control unit 11, so that the steering support can be adjusted by means of the servomotor 7 depending on the measured steering torque.

Figure 3:
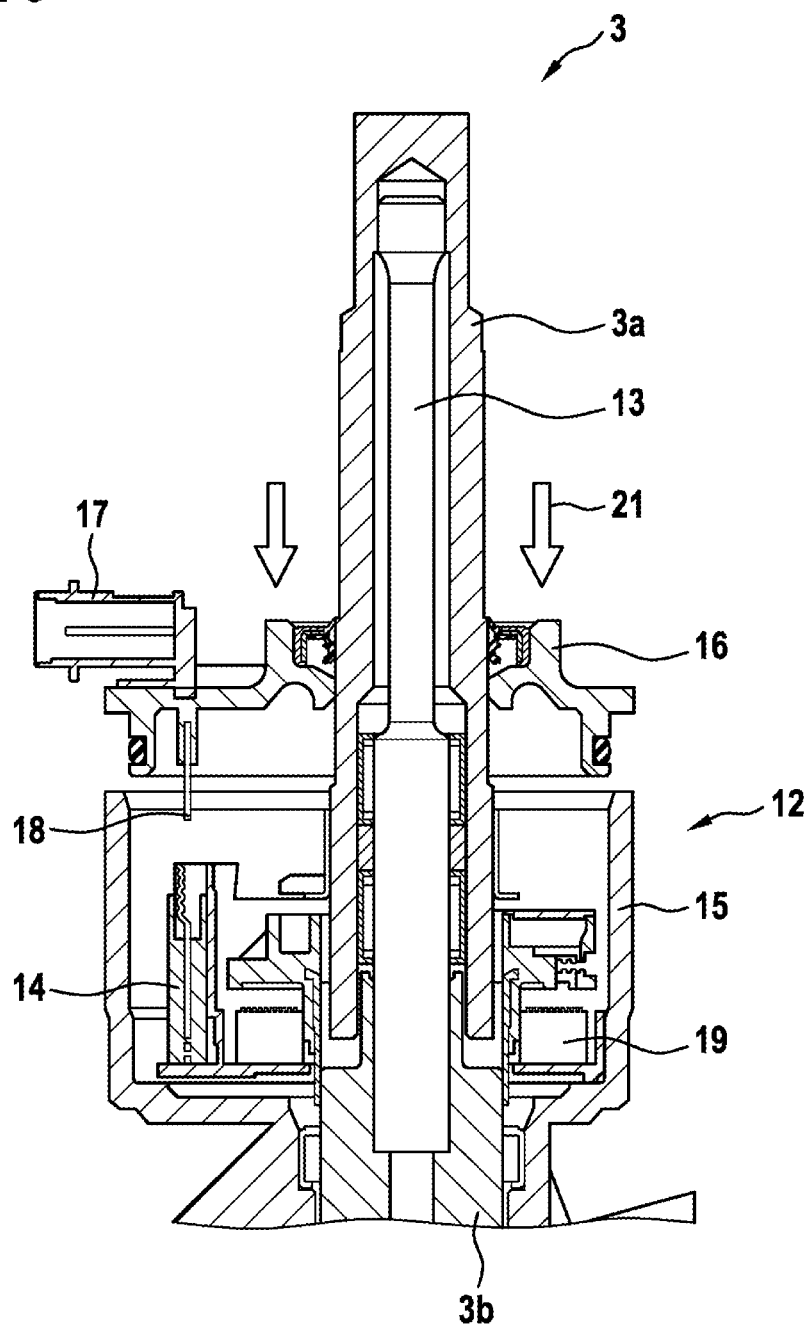
FIG. 3 shows a section through the torque sensor device, with a sensor cover that is to be mounted, which is the support of an outer contact unit and an inner contact unit for contacting the sensor element.

In FIG. 3, the torque sensor device 12 on the steering shaft 3 is shown during assembly. The steering shaft 3 comprises an input shaft 3a connected to the steering wheel and an output shaft 3b meshing with the rack, which are connected by means of a torsion bar 13. The torque sensor device 12 comprises a sensor housing 14, which is accommodated in a housing pot 15 of the steering housing, a sensor element 23, a permanent magnet 22 as signal transmitter and a sensor cover 16. The signal transmitter is connected to rotate with the input shaft 3a, the sensor element is connected to rotate with the output shaft 3b. An electrical winding tape 19 connects the sensor element to a counter-contact in the sensor housing 14.

The sensor cover 16 is the support of an outer contact unit 17 and an inner contact unit 18 on opposite sides of the sensor cover 16, wherein the outer contact unit 17 and the inner contact unit 18 are firmly connected to the sensor cover 16 or integrated therein. A connection to the control unit is made by means of the outer contact unit 17, which is in the form of a female connector part with internal plug-in openings. The electrical connection to the counter-contact in the sensor housing 14 is made by means of the inner contact unit 18. The outer contact unit 17 and the inner contact unit 18 are electrically connected to each other.

This version of the sensor cover 16 with an outer contact unit 17 and an inner contact unit 18 allows the electrical connection of the sensor device 12 to be carried out via the sensor cover 16. Moreover, no electrical connections are required for the sensor device 12.

The sensor cover 16 consists of a plastic material and is preferably manufactured in the plastic injection molding process. The housing components of the outer contact unit and possibly also the inner contact unit 18 can be formed in one piece with the plastic material of the sensor cover 16. It is in particular possible to implement the connector housing of the outer contact unit 17 in one piece with the sensor cover 16. The inner contact unit 18 comprises multiple connector pins, which are overmolded by the plastic material of the sensor cover 16. The outer contact unit 17 extends in the radial direction on the outer side of the sensor cover 16—relative to the longitudinal axis of the steering shaft 3—wherein the connector housing of the outer contact unit 17 extends beyond the radially outer circumferential side of the sensor cover 16.

Multiple hold-down elements 20 which are formed over the perimeter on the inside of the sensor cover 16 extend in the axial direction and have the function of pushing the sensor housing 14 axially into the housing pot 15 during the mounting of the sensor cover 16 on the housing pot 15 according to the arrows 21. During this, at the same time a locking device between the sensor element and the sensor housing 14 is released, so that the sensor element and the sensor housing 14 are independent of each other after completion of the assembly and the sensor element can rotate with the output shaft 3b, whereas the sensor housing 14 is firmly anchored in the housing pot 15 of the steering housing. The electrical connection between the sensor element and the counter-contact in the sensor housing 14 is made via the winding tape 19. Furthermore, an electronic component (not shown) can be integrated into the sensor cover 16 in addition to the inner contact unit 18 and the outer contact unit 17.

Figure 4:
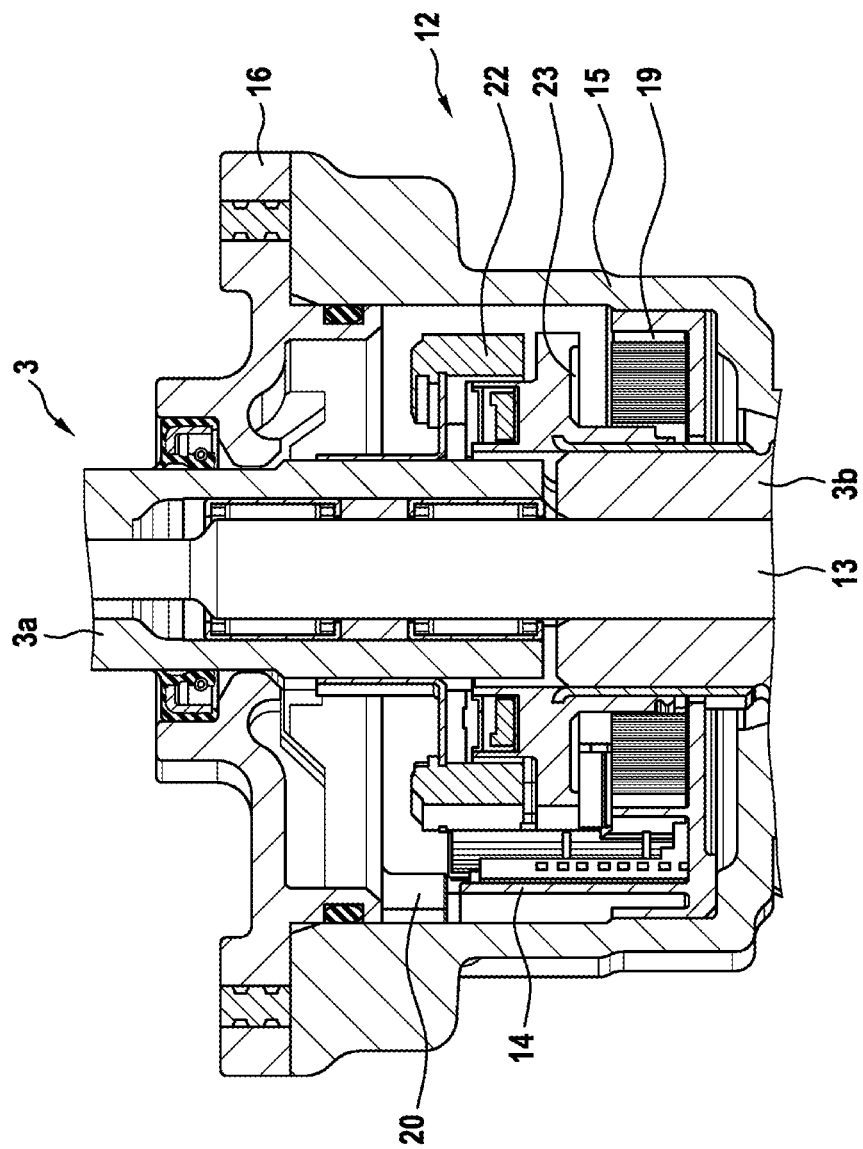
FIG. 4 shows a section through a torque sensor device with a sensor cover mounted.

In FIG. 4, the torque sensor device 12 is shown on the steering shaft 3 in the mounted state, in which the sensor cover 16 sits on the housing pot 15 of the steering housing and the sensor housing 14 is decoupled from the sensor element 23. The signal transmitter 22 is implemented as a permanent magnet and is connected to rotate with the input shaft 3a. The sensor element 23, which is firmly coupled to the output shaft 3b, detects the magnetic field emanating from the permanent magnet 22, wherein the sensor signals are transmitted via the winding tape 19 to the counter-contact in the sensor housing 14, which is connected to the inner contact unit 18 on the sensor cover 16.

Figure 5:
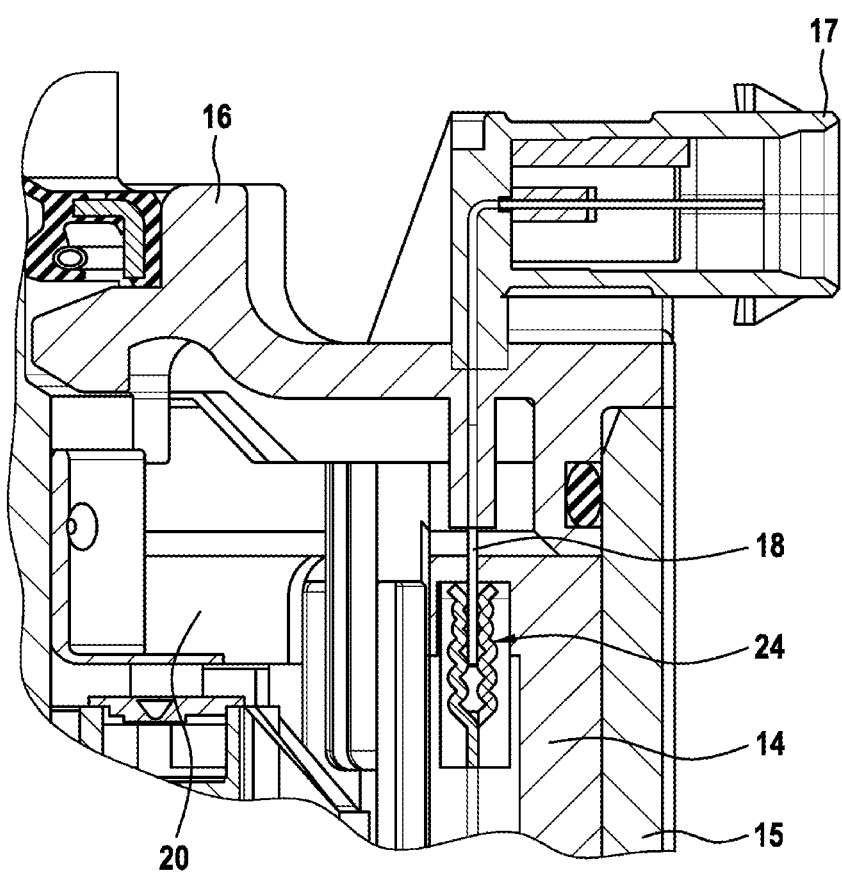
FIG. 5 shows a section through a torque sensor device in the area of contact between the outer contact unit and the inner contact unit on the sensor cover and a plug-in receptacle that is electrically connected to the sensor element.
Figure 6:
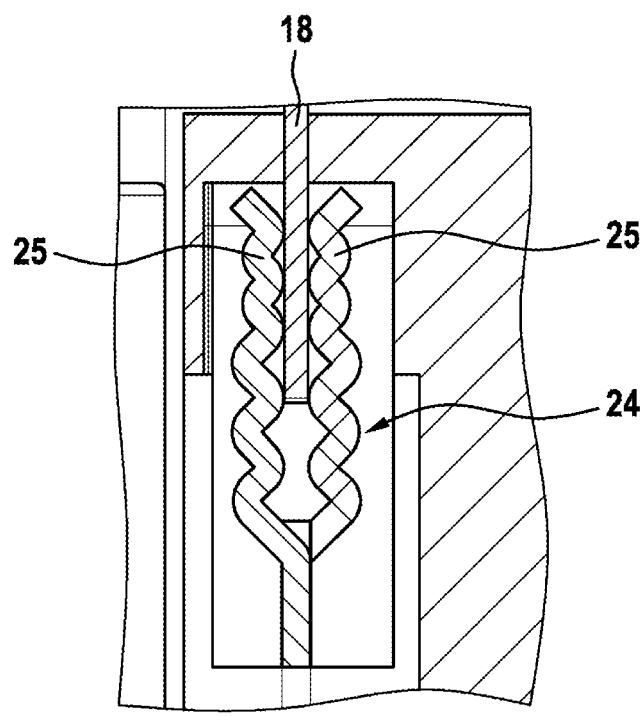
FIG. 6 shows an enlarged view of the plug-in receptacle with an intruding connector pin.
Figure 7:
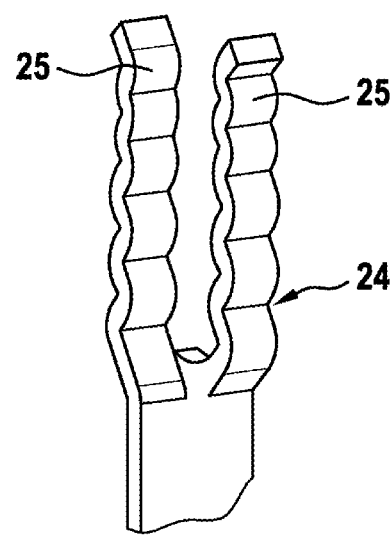
FIG. 7 shows the plug-in receptacle with two mutually offset connector legs in a detailed representation.

As can be seen in FIGS. 5 through 7, the counter-contact 24 in the sensor housing 14 is in the form of a plug-in receptacle, which has two connector legs 25, between which the inner contact 18 lies. The inner contact 18 on the inside of the sensor cover 16 is in the form of a connector pin, which protrudes into the space between the two connector legs 25 of the plug-in receptacle 24. The connector legs 25 have a corrugation, and they run parallel to each other but are laterally offset relative to each other. Thus, the contact surfaces of the connector legs 25, with which the connector pin 18 is in contact, are not positioned directly opposite each other, but are arranged laterally offset relative to each other, wherein the lateral offset corresponds at least to the width of each connector leg 25. This lateral offset between the connector legs 25 allows the accommodation of the connector pin 18 with greater positioning tolerance, so that a secure accommodation of the connector pin 18 between the connector legs 25 is guaranteed even if the connector pin 18 is inserted into the plug-in receptacle with a certain tolerance in the circumferential direction or in the radial direction and also in the axial direction.

As can also be seen in FIG. 5, the connector pin 18 is implemented as a wire, which is injected into the plastic material of the sensor cover 16 and extends to the outer contact unit 17.

Figure 8:
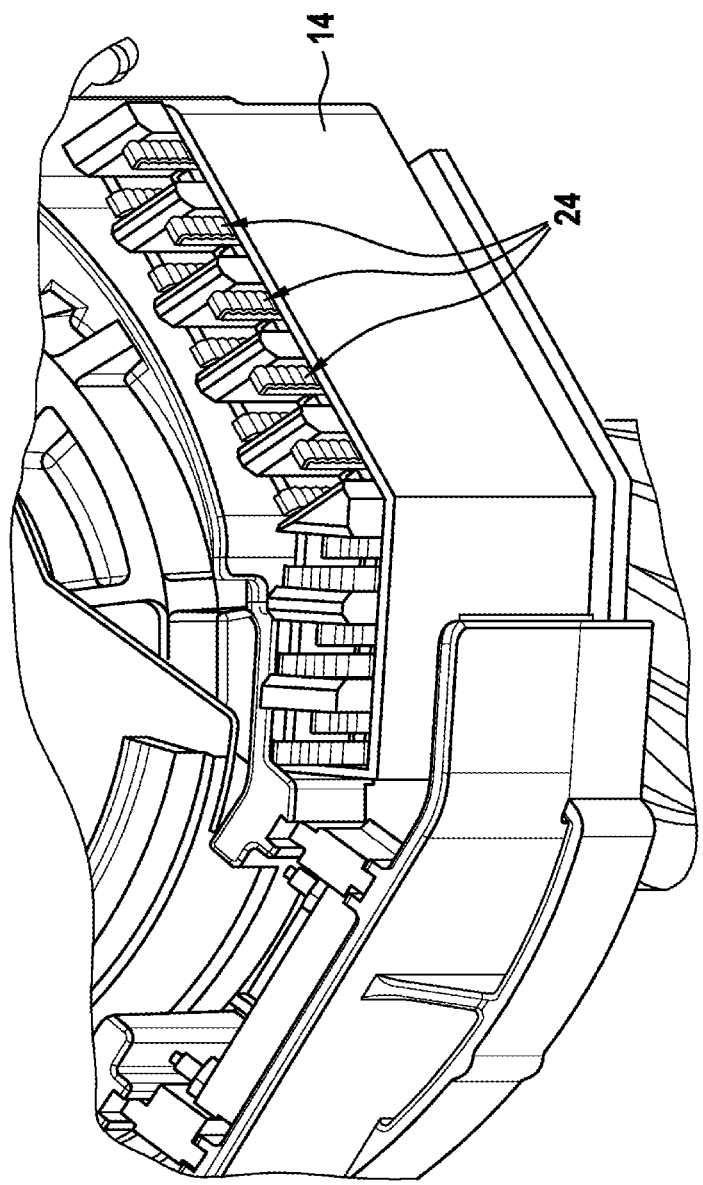
FIG. 8 shows a section of the sensor housing of the torque sensor device with a plurality of plug-in receptacles arranged side by side.

FIG. 8 shows a section of the sensor housing 14 with a number of side-by-side counter-contacts 24, each in the form of a plug-in receptacle with two connector legs according to FIGS. 5 through 7. The plug-in receptacles accommodate a corresponding number of connector pins of the inner contact unit 18 on the sensor cover 16.

In FIGS. 9 through 15, different versions of sensor covers 16 with an outer contact unit 17 and an inner contact unit 18 are shown.

Figure 9:
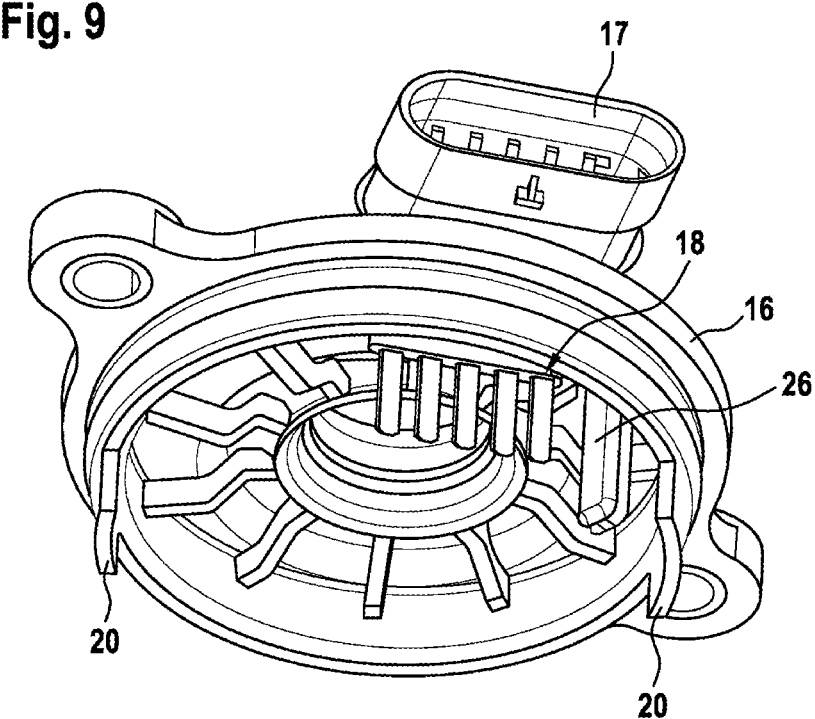
FIG. 9 shows a perspective view of the sensor cover with connector pins on the inside and a connector part with radial orientation on the outer side of the cover.

The sensor cover according to FIG. 9 corresponds to the one from FIGS. 3 and 5. The outer contact unit 17 is in the form of a female connector part with a contact housing and internal plug-in openings and extends in the radial direction, wherein the contact housing protrudes beyond the outer circumference of the sensor cover 16. The inner contact unit 18 comprises several connector pins, which extend in the axial direction, so that with mounting of the sensor cover 16 the contact pins 18 enter the counter-contacts in the sensor housing and the desired electrical connection is established. The hold-down elements 20, which press the sensor housing 14 into the housing pot 15 during assembly, are located on opposite sides on the inside of the sensor cover 16.

A positioning element 26 which is also formed on the inside of the sensor cover 16 is implemented as an axially extending positioning pin. During assembly, the positioning element 26 enters into engagement with a corresponding recess in the sensor housing and ensures correct positioning of the sensor cover 16 relative to the sensor housing.

Figure 10:
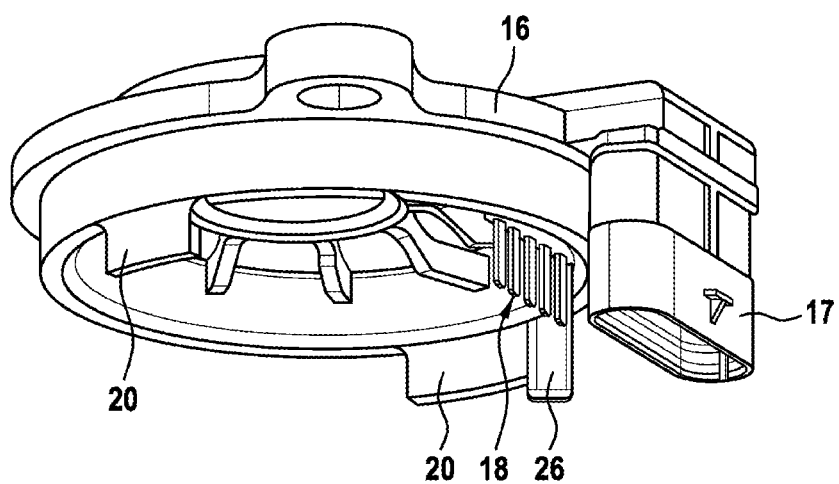
FIG. 10 shows a sensor cover in a further version with an axially downward-facing connector part on the outside of the sensor cover.
Figure 11:
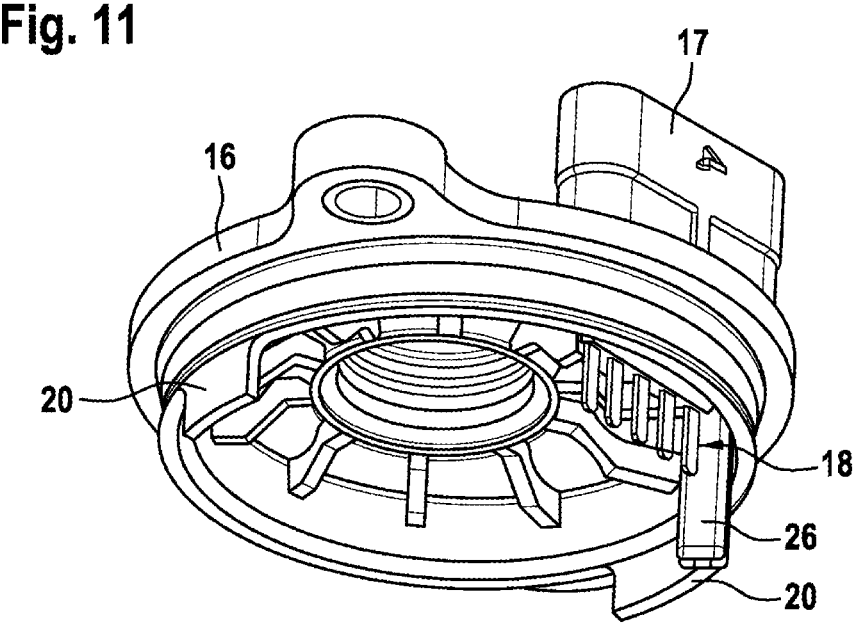
FIG. 11 shows a sensor cover in a further version with a connector part arranged on the outer side of the cover, which is directed axially outwards.

The sensor covers 16 according to FIGS. 10 and 11 essentially correspond to the embodiment according to FIG. 9, but with a different orientation and arrangement of the outer contact unit 17. According to FIG. 10, the outer contact unit 17 lies on the outer circumference of the sensor cover 16 and has an axially inward-facing orientation. According to FIG. 11, the outer contact unit 17 lies on the outside of the sensor cover 16 and has an axially outward-facing orientation.

Figure 12:
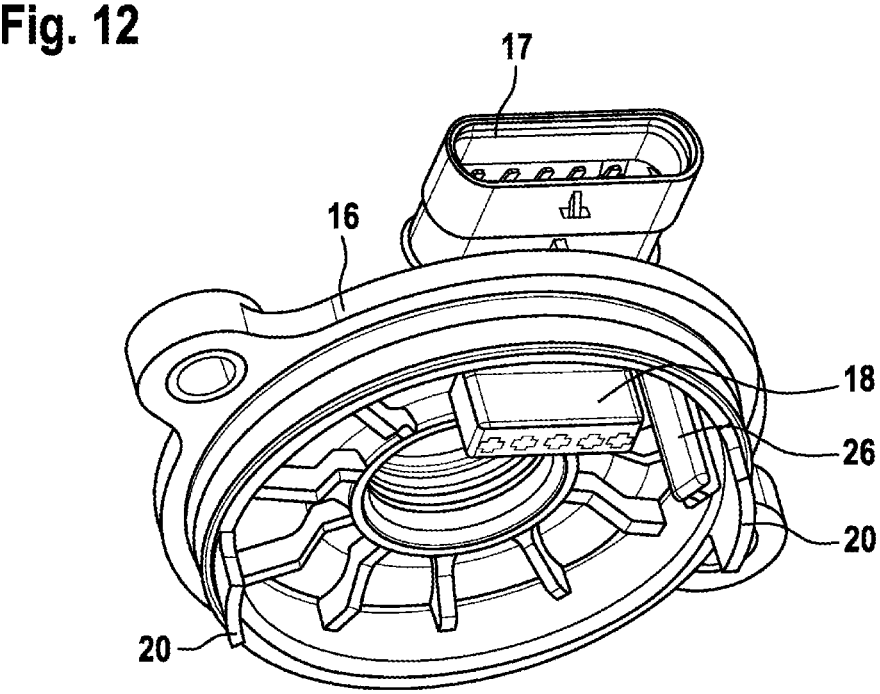
FIG. 12 shows a sensor cover in a further version with an inner contact unit on the inner side of the cover, which is formed with plug-in openings.

In FIG. 12, as with FIG. 9 the sensor cover 16 is provided with an outer contact unit 17, which is in the form of a female connector and which is directed outwards. Also the inner contact unit 18 is in the form of a female connector part with a series of plug-in receptacles.

Figure 13:
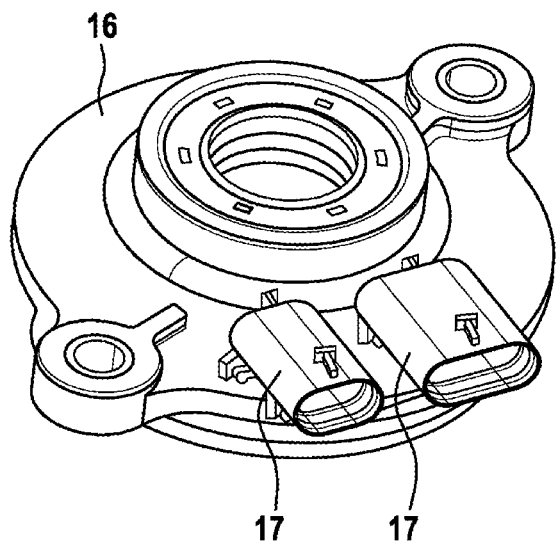
FIG. 13 shows a sensor cover in a further version with two separately formed connector parts arranged on the outer side of the cover.

In the exemplary embodiment according to FIG. 13, the sensor cover 16 is equipped with two adjacent outer contact units 17, each of which is in the form of a female connector part and each of which has a contact housing, which is formed in one piece with the plastic material of the sensor cover 16.

Figure 14:
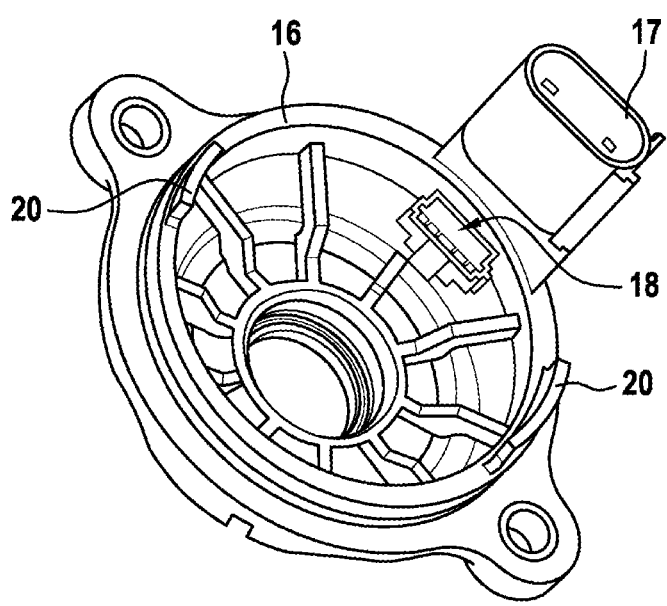
FIG. 14 shows a sensor cover in a further version with a connector element on the inside of the cover for receiving a cable connection.
Figure 15:
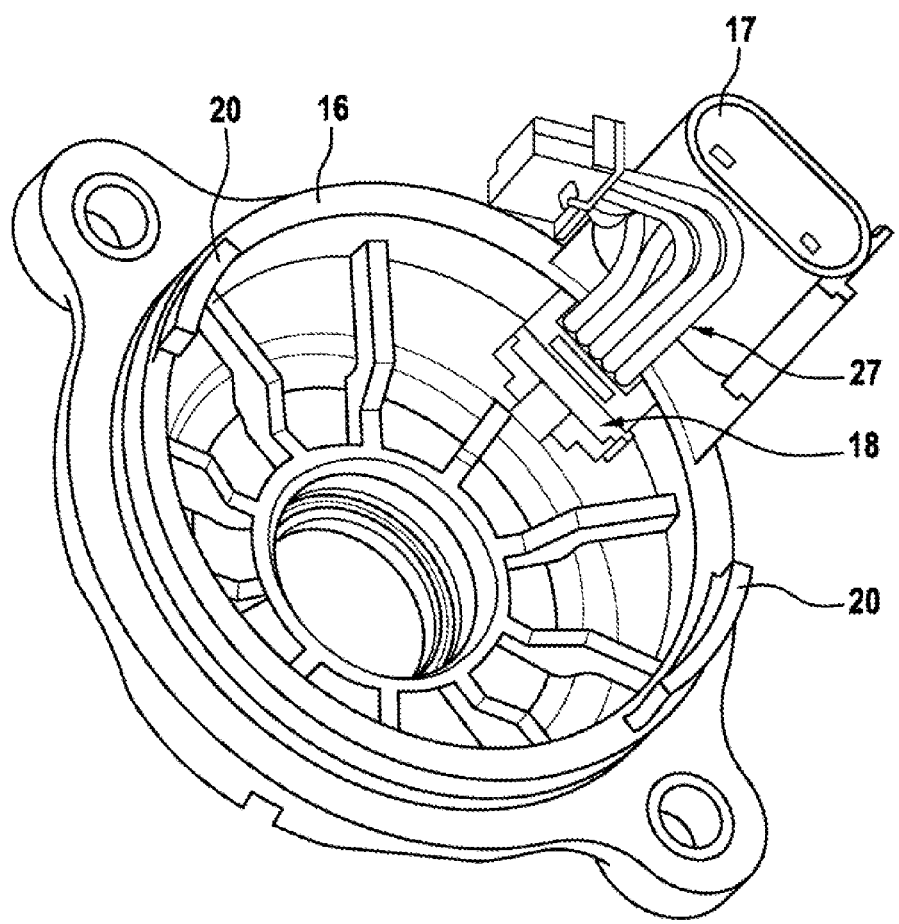
FIG. 15 shows the sensor cover according to FIG. 14 with an attached cable connection that has flexible cables.

In FIGS. 14 and 15, another exemplary embodiment of a sensor cover 16 is shown, in which the inner contact unit is in the form of a connector element, onto which a corresponding connector element of a cable connection 27 can be plugged. The cable connection 27 also has a connector element at its second end, which can be placed in plug-in connection with the counter-contact on the sensor housing. The cable connection 27 between the inner contact unit 18 and the counter-contact on the sensor housing is flexibly designed and makes it possible to bridge even larger distances or tolerances between the inner contact unit 18 and the counter-contact in the sensor housing.

The invention claimed is:

1. A sensor device for a steering system of a vehicle, comprising:
    a sensor housing configured to be accommodated within a housing pot and including a first central recess, the first central recess defining an axis and configured to receive a shaft of the steering system so as to mount the sensor housing on the shaft;
    a sensor element configured to be coupled to the shaft;
    a sensor cover configured to be mounted on the housing pot and including a second central recess, the second central recess configured to receive the shaft so as to mount the sensor cover on the shaft;
    an inner contact unit firmly connected to the sensor cover and configured to electrically communicate with the sensor element, the inner contact unit arranged on an inside of the sensor cover and including a connector part axially oriented along the axis; and
    an outer contact unit firmly connected to the sensor cover on an outside of the sensor cover and electrically connected to the inner contact unit, wherein
    the sensor housing further includes a plug-in receptacle configured to receive the connector part, the plug-in receptacle including two connector legs including respective contact surfaces which are at least approximately parallel, and laterally offset relative to each other and configured to accommodate the connector part therebetween.

2. The sensor device as claimed in claim 1, the inner contact unit further comprising:
    a plurality of connector pins.

3. The sensor device as claimed in claim 1, wherein at least one of the inner contact unit and the outer contact unit include connector elements overmolded by plastic material of the sensor cover.

4. The sensor device as claimed in claim 1, wherein at least one of the outer contact unit and the inner contact unit comprises a contact housing formed in one piece with the sensor cover.

5. The sensor device as claimed in claim 1, wherein the outer contact unit is in the form of a radially oriented connector part or an axially oriented connector part.

6. The sensor device as claimed in claim 1, wherein the outer contact unit is in the form of a female connector part with internal plug-in openings.

7. The sensor device as claimed in claim 1, wherein the sensor cover further comprises:
    an electronic component integrated within the sensor cover.

8. The sensor device as claimed in claim 1, further comprising:
    a cable connection configured to extend between the inner contact unit and a counter-contact on the sensor housing.

9. The sensor device as claimed in claim 1, the sensor cover further comprising:
    an axially protruding hold-down element arranged on the inside of the sensor cover and configured to press the sensor housing into the housing pot.

10. The sensor device as claimed in claim 1, wherein the sensor element is a steering torque sensor configured to determine a steering torque acting on the shaft.

11. The sensor device as claimed in claim 1, wherein the sensor element is a steering angle sensor configured to determine a steering angle.

12. A vehicle steering system, comprising:
    a steering shaft;
    a sensor housing accommodated within a housing pot of a steering housing and including a first central recess, the first central recess defining an axis and receiving the steering shaft such that the sensor housing is mounted on the steering shaft;
    a sensor element coupled to the steering shaft;
    a sensor cover mounted on the housing pot and including a second central recess, the second central recess receiving the steering shaft such that the sensor cover is mounted on the steering shaft;
    an inner contact unit firmly connected to the sensor cover and electrically contacting the sensor element, the inner contact unit arranged on an inside of the sensor cover and including a connector part axially oriented along the axis; and
    an outer contact unit firmly connected to the sensor cover unit on an outside of the sensor cover and electrically connected to the inner contact unit, wherein
    the sensor housing further includes a plug-in receptacle configured to receive the connector part, the plug-in receptacle including two connector legs including respective contact surfaces which are at least approximately parallel, and laterally offset relative to each other and configured to accommodate the connector part therebetween.

* * * * *

UNITED STATES PATENT AND TRADEMARK OFFICE
CERTIFICATE OF CORRECTION

| | |
|---|---|
| PATENT NO. | : 11,447,180 B2 |
| APPLICATION NO. | : 16/954345 |
| DATED | : September 20, 2022 |
| INVENTOR(S) | : Weber et al. |

It is certified that error appears in the above-identified patent and that said Letters Patent is hereby corrected as shown below:

On the Title Page

On Page 2:
In Item (56) References Cited, under the heading FOREIGN PATENT DOCUMENTS, at Line 4:
"DE 396 30 893 T2" should read --DE 696 30 893 T2--

Signed and Sealed this
Fourteenth Day of March, 2023

Katherine Kelly Vidal
*Director of the United States Patent and Trademark Office*